Inventors
Harold R. Van Blaricon
Sam J. Rutland

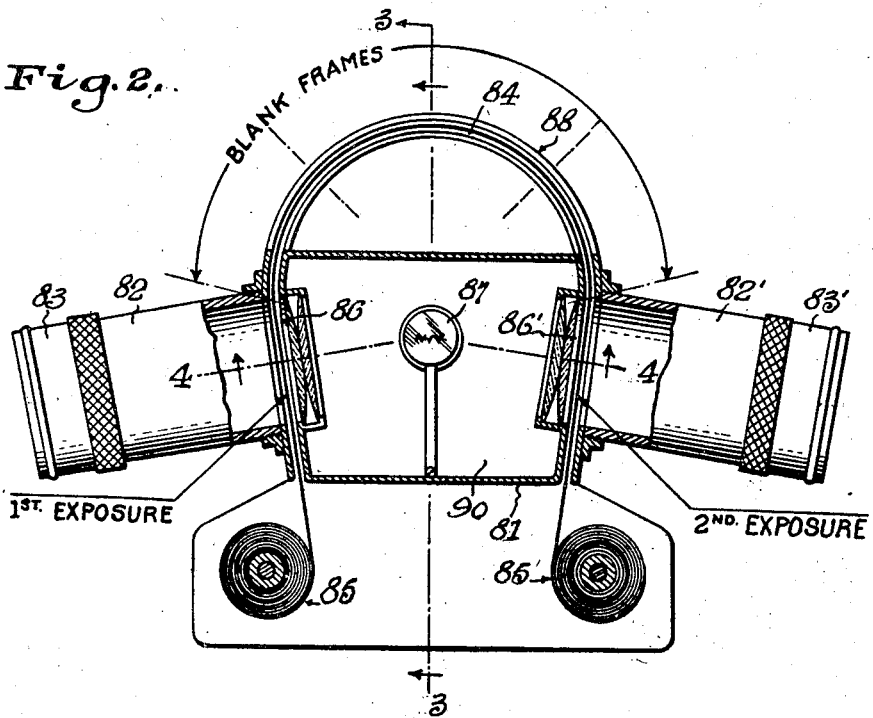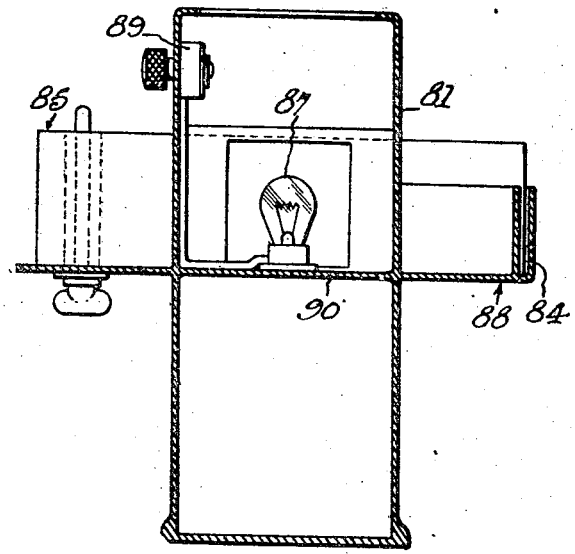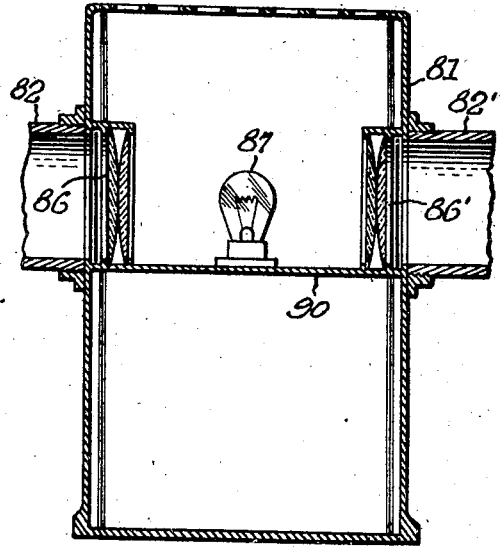

Patented Jan. 25, 1944

2,339,822

UNITED STATES PATENT OFFICE 2,339,822

APPARATUS FOR PRODUCING AND VIEWING STEREOSCOPIC PHOTOGRAPHS

Harold R. Van Blaricon and Sam J. Rutland, United States Army

Application November 13, 1941, Serial No. 418,886

6 Claims. (Cl. 88—16.6)

(Granted under the act of March 3, 1883, as amended April 30, 1928; 370 O. G. 757)

This invention described herein may be manufactured and used by or for the Government for governmental purposes, without the payment to us of any royalty thereon.

This invention relates generally to the projection of stereoscopic views, but more particularly to an apparatus for projecting X-ray pictures so that they may be viewed stereoscopically.

One object of the invention is to provide a projection apparatus by which photographs may be viewed stereoscopically without alteration to the film strip on which they are photographed.

Another object of the invention is to provide an apparatus of the type described which is simple in design and economical in construction, and one in which minor repairs may be made at little cost.

With these and other objects in view, this invention consists of certain novel details of construction, combination and arrangement of parts, to be more fully hereinafter described and claimed.

Referring to the drawings in which like parts are represented by similar reference characters:

Fig. 2 is a top plan view of the projector, shown in Fig. 1, partially sectionized to shown the film path;

Fig. 3 is a sectionized view taken on the line 3—3 of Fig. 2;

Fig. 4 is a sectionized view taken on the line 4—4 of Fig. 2;

In the operation of the projector the film is unwound from one reel and wound on the other, and spaced frames thereon retained opposite the lens barrels to thereby project the stereoscopic pairs of photographs upon suitably placed projection screens where they may be viewed by a specially constructed viewing device as will be described.

Figure 1:
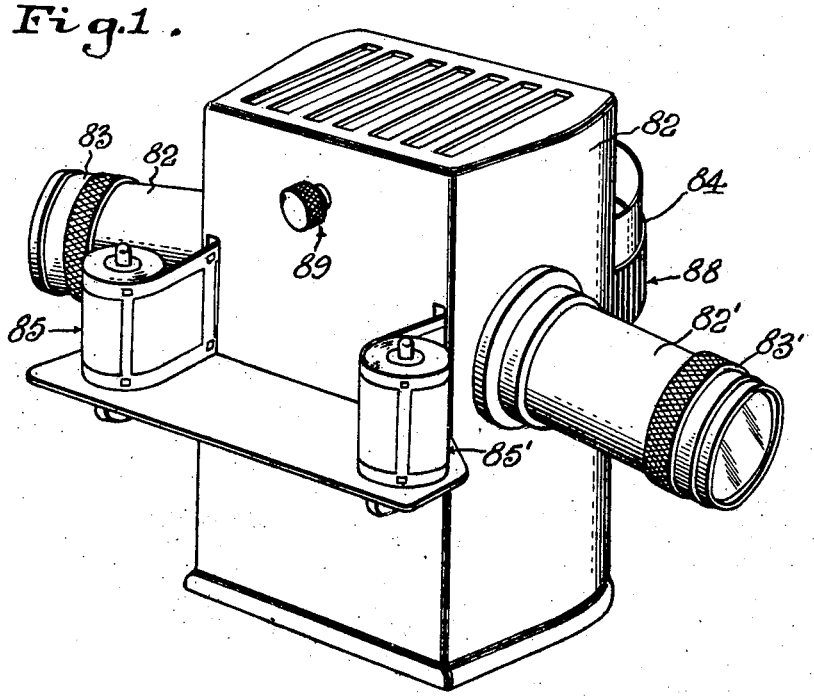
Fig. 1 is a perspective view of a projector for showing spaced film frames.

Referring to Fig. 1 it will be noted that the projector is constructed with a central lamp house 81 from which project on either side thereof lens barrels 82 and 82' equipped with focusing lens supports 83 and 83'. A film track 84 extends along the inner side of the laterally spaced walls of the lamp house and is arcuately curved at the rear of the lamp house to accommodate the passage of film from one of the reels 85 or 85' to the other, as shown in Figs. 2 and 5.

The track is U-shaped in section and is provided with openings 86 and 86' in front of the lens barrels for the projection of light from a centrally located lamp 87. With the construction as shown, the film is slid through the U-shaped track until the first and second exposures of any picture are opposite the openings to the lens barrels 82 and 82' and the intermediate blank frames extend around the arcuate portion 88 of the track.

The lamp 87, the current to which is controlled by the rheostat 89 is located on the center line of the lamp house 81 and supported on the floor 90 located within the body of the housing. The lamp house is located intermediate the two screens 54 and 55 as shown in Fig. 5 upon which a stereoscopic pair of photographs are projected and the projected images are viewed by the use of reflecting mirrors as described below.

Figure 5:
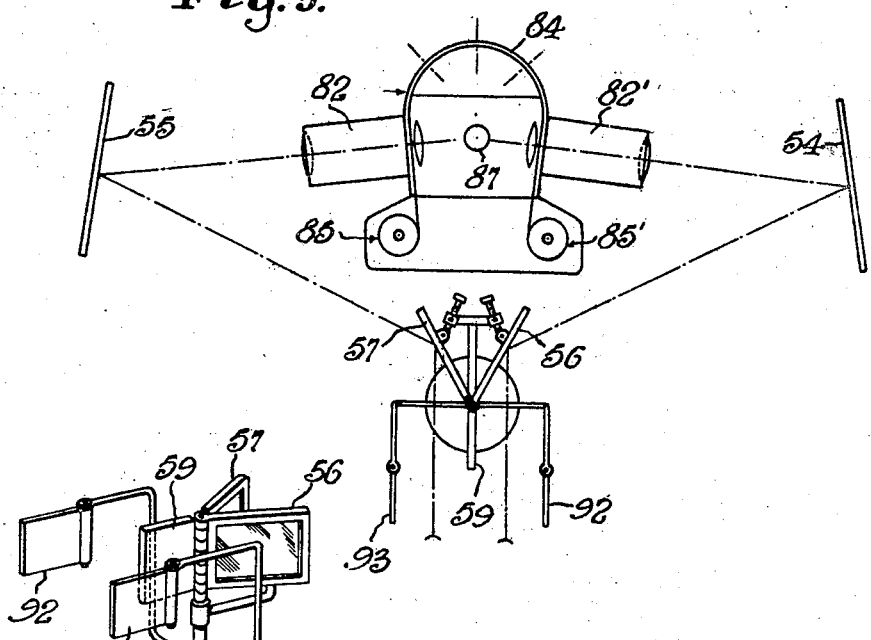
Fig. 5 is a diagrammatic view showing the projector illustrated in Fig. 1 with the projection screens, and stereoscopic viewing device.
Figure 6:
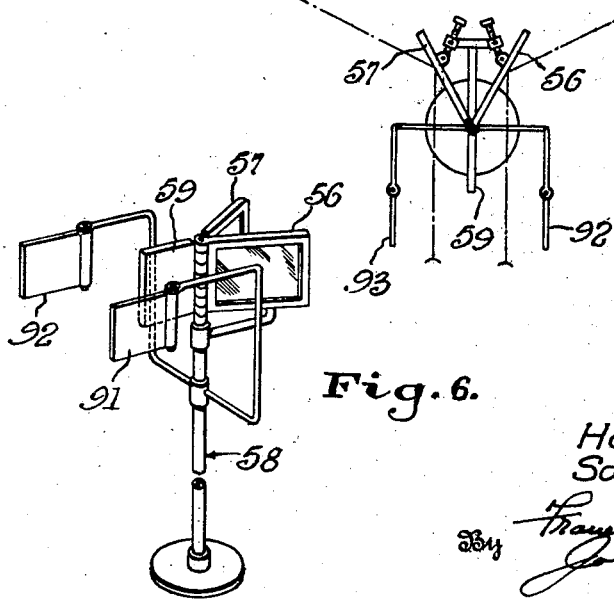
Fig. 6 is a perspective view of the stereoscopic viewing device.

The spaced stereoscopic photographs are projected upon a pair of screens 54 and 55 which are positioned at such an angle that the images projected thereon will be reflected upon a pair of mirrors 56 and 57, which are pivotally mounted upon a support 58, as shown in Figs. 5 and 6, and which may be so adjusted that the reflection of the images projected upon the screens may be seen stereoscopically by an observer who views them so that the lines of vision are separated by a centrally located dividing plane 59. In order to prevent other rays from the mirrors 56 and 57 from entering the eyes of the observer while viewing the screens, a pair of eyeshades 91 and 92 are provided.

Having described our invention, what we claim as new and wish to secure by Letters Patent is:

1. A device of the character described adapted to project a stereoscopic pair of photographs upon angularly disposed screens, comprising, a lamp house, a source of illumination mounted within said lamp house, lens barrels extending from said lamp house and radially from said light source, condensing lenses in spaced relation to the inner termination of said lens barrels, a film track formed as a loop having its end portions adjacent the inner termination of said lens barrels and adapted to direct the movement of a film strip so as to present stereoscopic pairs of photographs thereon in the path of rays through said lens barrels for projection purposes, and spindles mounted exterior to said lamp house adjacent the termination of said track for rotatably mounting film spools.

2. A device of the character described adapted to project a steroscopic pair of photographs upon angularly disposed screens, comprising, a lamp house, a light source mounted within said lamp house, lens barrels extending from said lamp house and radially from said light source, a condenser in spaced relation to the inner termination of said lens barrels within said lamp house, a film track formed with a central loop and having straight end portions, said loop extending rearward and to the exterior of said lamp house and its straight end portions adjacent the inner termination of said lens barrels, said track being adapted to direct the movement of a film strip so as to present interspaced stereoscopic pairs of photographs thereon in the path of rays from said light source between said condensers and said lens barrels for projection purposes, and spindles mounted on a shelf exterior to said lamp house and adjacent the termination of said track for rotatably mounting film spools.

3. A device of the character described adapted to project a stereoscopic pair of photographs upon angularly disposed screens for viewing purposes, comprising, a lamp house having angularly disposed side walls, a source of illumination mounted centrally within said lamp house, projecting lens barrels extending perpendicularly from said side walls of said lamp house and radially from said light source, condensing lenses in spaced relation to said side walls at the inner termination of said lens barrels, a film track formed as a loop having its end portions adjacent the side walls and adapted to direct the movement of a multiple frame film strip so as to present stereoscopic pairs of photographs thereon in the path of rays through said lens barrels for projection purposes, and spindles mounted adjacent the termination of said track for rotatably mounting film spools.

4. A device of the character described adapted to project stereoscopic pairs of photographs upon angularly disposed screens for viewing purposes comprising a lamp house, a source of illumination mounted centrally within said lamp house, projecting lens barrels extending from the walls of said lamp house radially from said central light source, and at a predetermined angle to each other, condensing lenses in spaced relation to the inner termination of said lens barrels, a film track having a centrally located semicircular portion and straight end portions, said latter portions being positioned intermediate said condensing lenses and said projecting lens barrels, said track being adapted to guide the movement of film strips so as to present interspaced stereoscopic pairs of photographs before said lens barrels for projection of said photographs upon said angularly disposed screens.

5. A device of the character described adapted to project interspaced stereoscopic pairs of photographs upon angularly disposed screens for viewing purposes comprising, a lamp house, a light source mounted within said lamp house, projecting lens barrels extending from the walls of said lamp house radially from said central light source and at a predetermined angle to each other, condensing lenses in spaced relation to the inner terminations of said lens barrels, a loop shaped film track having a centrally located semicircular portion partially surrounding said light source and straight end portions positioned intermediate said condensing lenses and said lens barrels, said track being adapted to guide the movement of film strips so as to present stereoscopic pairs of photographs before said lens barrels for projection purposes.

6. A device for viewing stereoscopic pairs of photographs comprising, means adapted to align interspaced stereoscopic pairs of picture frames on film strips for projection on angularly arranged screens, said means including a lamp house provided with a single light source and two angularly disposed lens barrels aligned radially to said light source and normal to said screens, and means comprising a film track including an arcuate intermediate portion, and straight angularly arranged end portions adjacent the inner termination of said lens barrels and normal to the optical axis thereof, adapted to direct said film so that stereoscopic pairs of photographs may be projected simultaneously upon said screens and means including angularly arranged mirrors for viewing projected images on said screens.

HAROLD R. VAN BLARICON.
SAM J. RUTLAND.